United States Patent [19]

Aron

[11] Patent Number: 4,656,821
[45] Date of Patent: Apr. 14, 1987

[54] HAYMAKING MACHINE FOR THE TEDDING

[75] Inventor: Jerome Aron, Dossenheim-sur-Zinsel, France

[73] Assignee: Kuhn S.A., Saverne, France

[21] Appl. No.: 839,149

[22] Filed: Mar. 13, 1986

Related U.S. Application Data

[63] Continuation of Ser. No. 624,942, Jun. 27, 1984, Pat. No. 4,628,673.

[30] Foreign Application Priority Data

Jul. 19, 1983 [FR] France .................................. 83 12036

[51] Int. Cl.$^4$ ............................................. A01D 81/00
[52] U.S. Cl. ....................................... 56/370; 56/400; 56/365
[58] Field of Search ................. 56/400, 372, 365, 370, 56/DIG. 21

[56] References Cited

U.S. PATENT DOCUMENTS

4,397,135  9/1983  Wattron ................................ 56/370

FOREIGN PATENT DOCUMENTS

| 2448456 | 4/1974 | Fed. Rep. of Germany . |
| 2432827 | 1/1976 | Fed. Rep. of Germany ........ 56/370 |
| 2838912 | 3/1980 | Fed. Rep. of Germany ........ 56/370 |
| 2405007 | 5/1979 | France . |
| 1444074 | 7/1976 | United Kingdom .................. 56/370 |
| 2029189 | 3/1980 | United Kingdom .................. 56/370 |
| 2065436 | 7/1981 | United Kingdom .................. 56/370 |
| 2065435 | 7/1981 | United Kingdom . |

*Primary Examiner*—Gene Mancene
*Assistant Examiner*—John G. Weiss
*Attorney, Agent, or Firm*—Marmorek, Guttman & Rubenstein

[57] ABSTRACT

In a haymaking machine, at least two drums; a flexible skirt on the lower part of each drum; spaced collectors on the periphery of each drum and means for raising cut hay or fodder plants into a zone located between the drums so as to bring the hay or plants in contact with the collectors.

6 Claims, 19 Drawing Figures

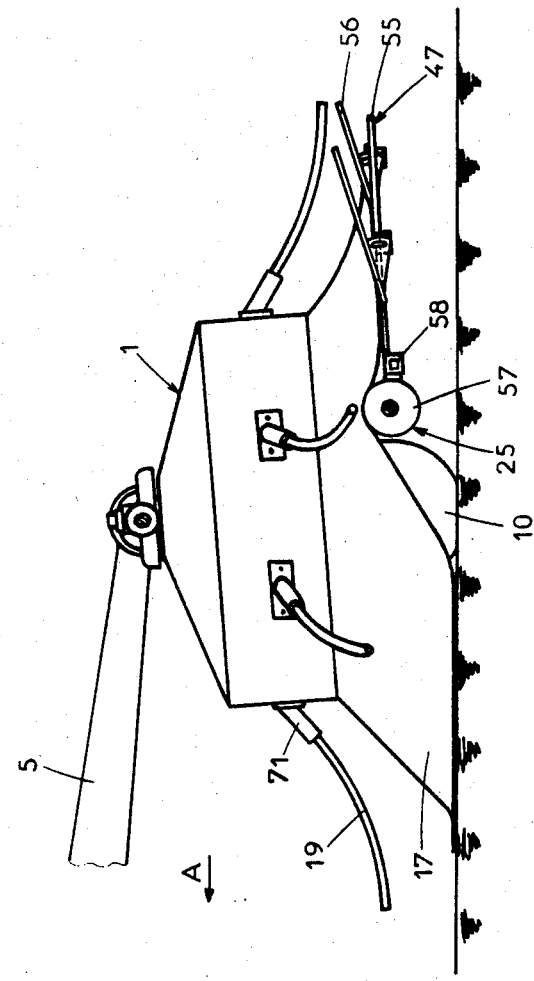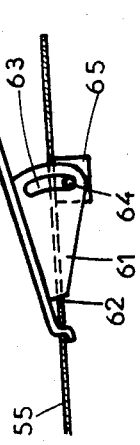

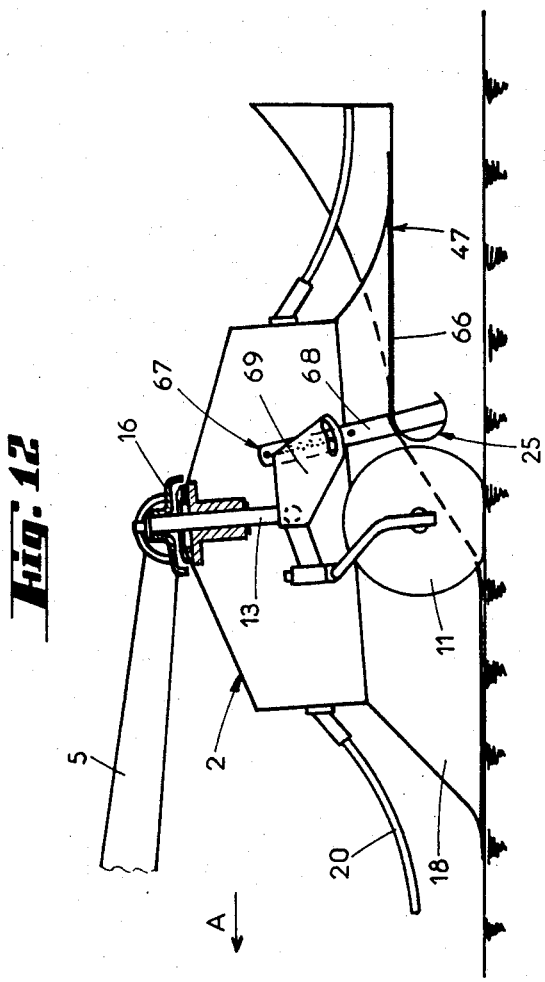

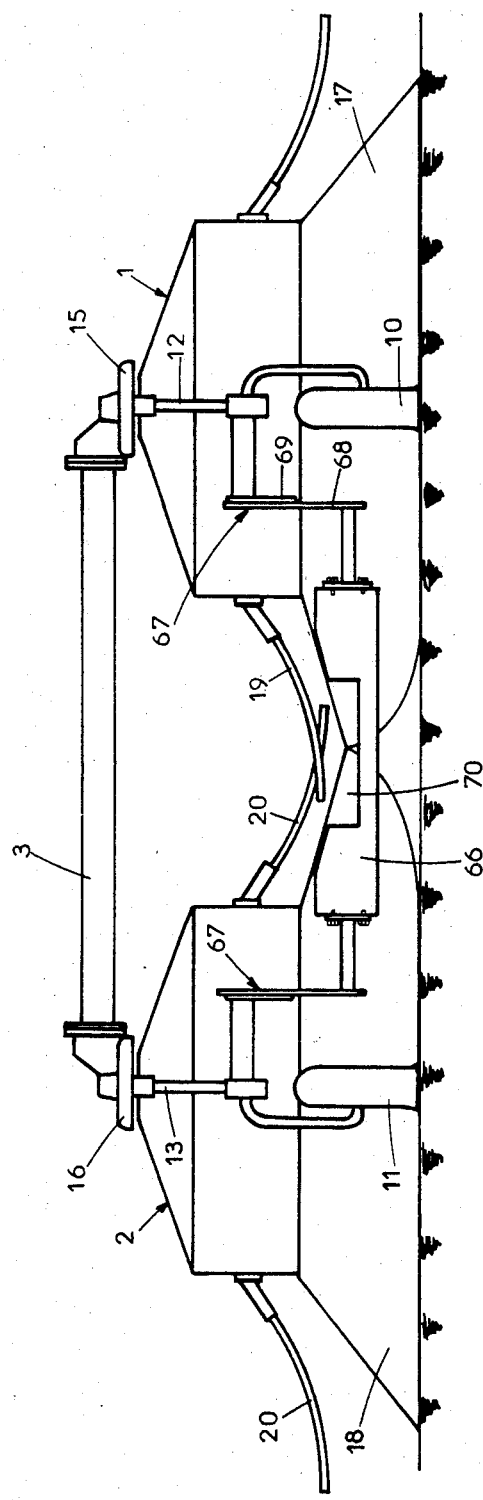

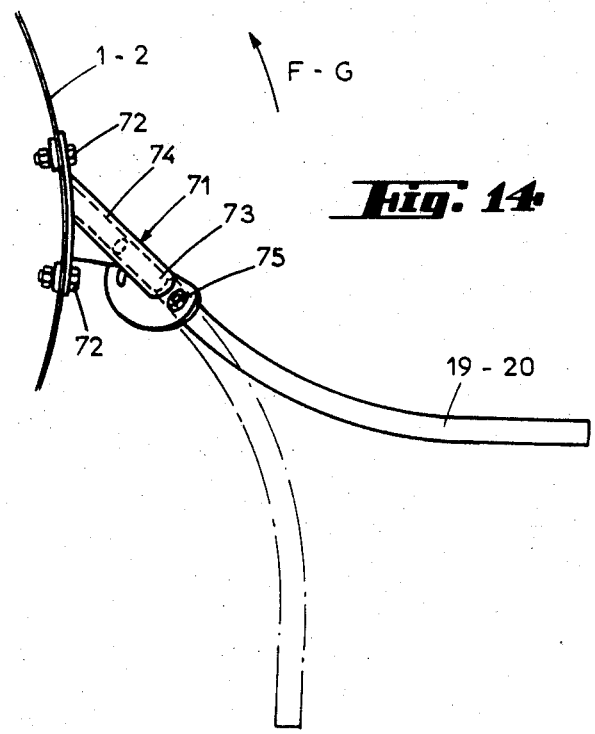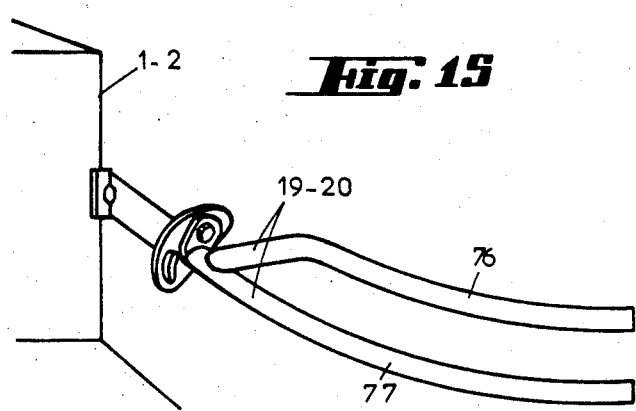

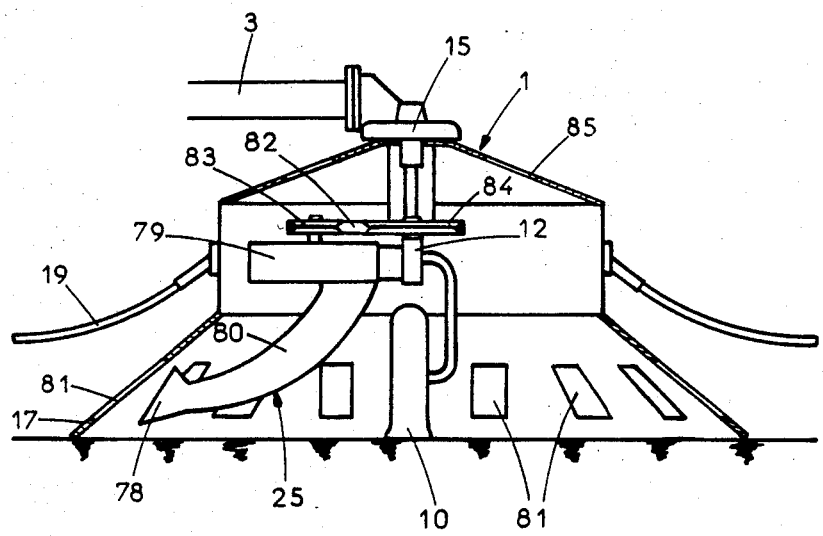

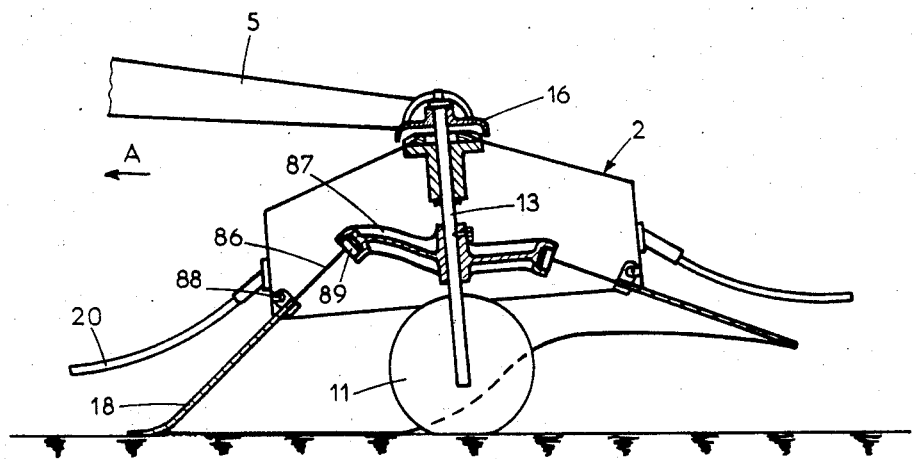

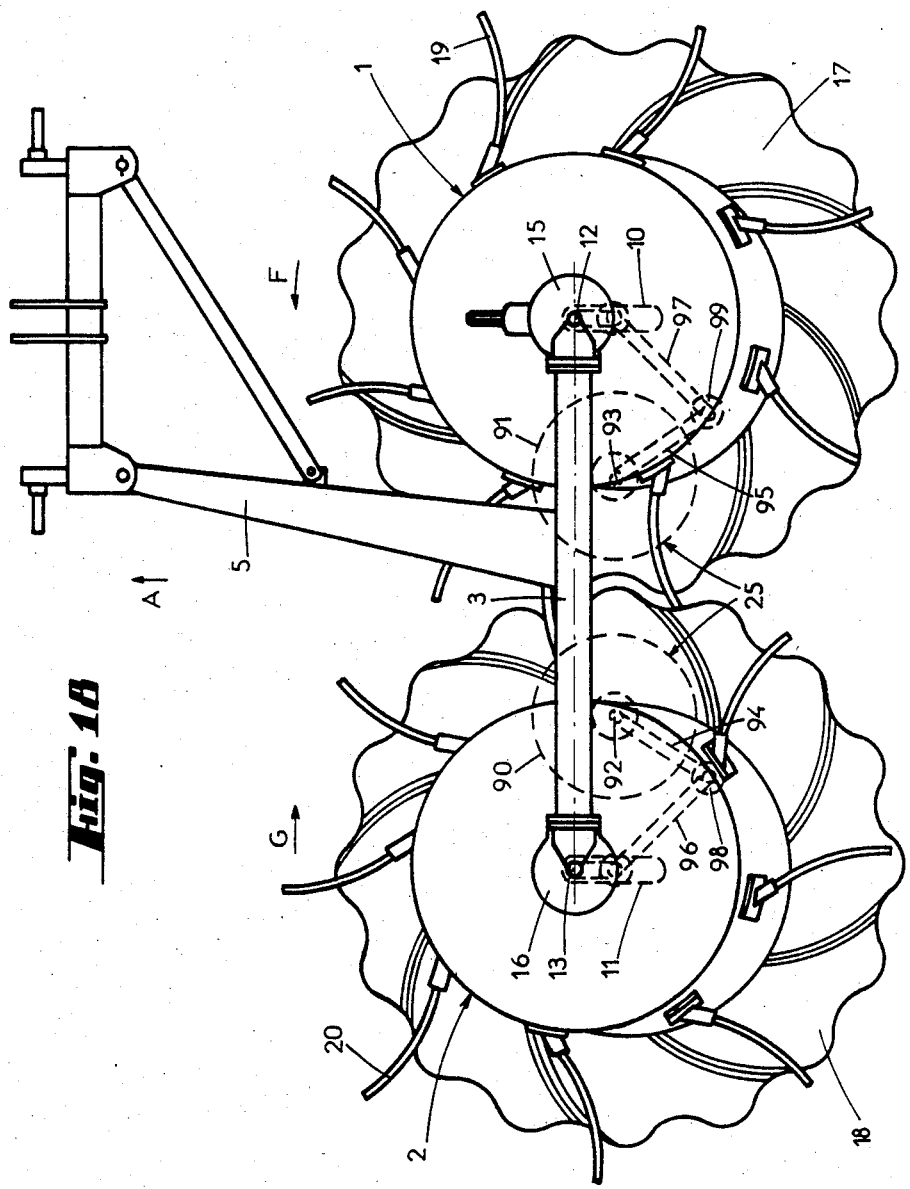

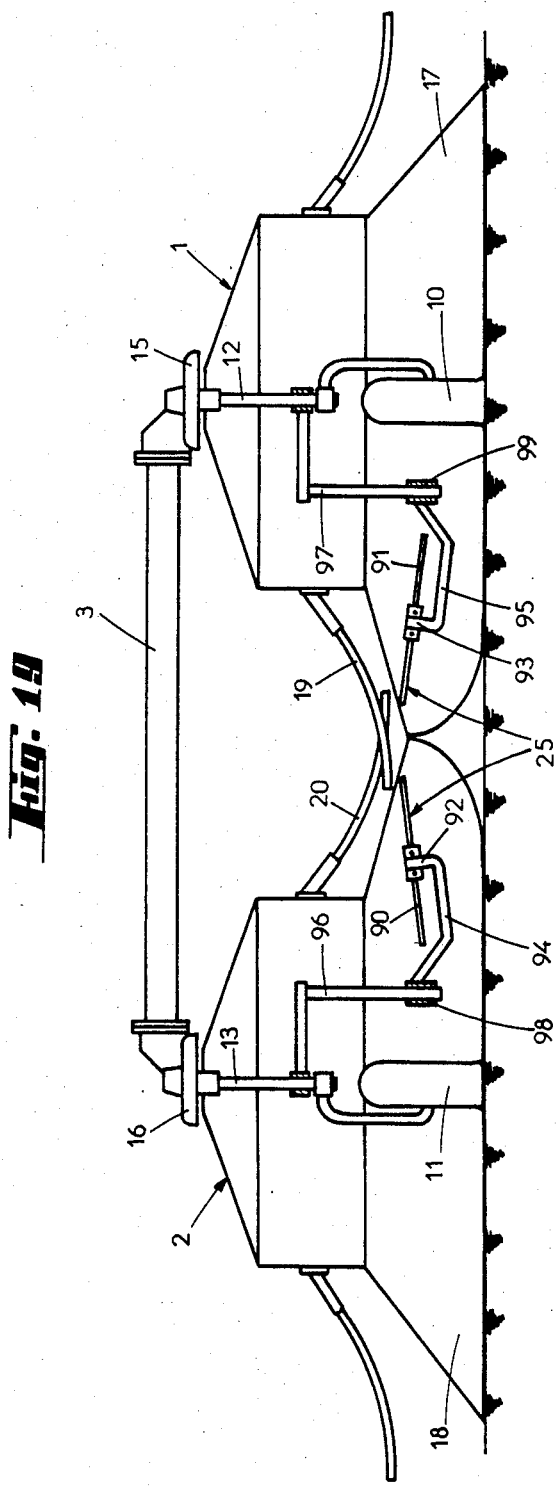

HAYMAKING MACHINE FOR THE TEDDING

BACKGROUND OF THE INVENTION

This is a continuation of application Ser. No. 624,942, filed June 27, 1984, now U.S. Pat. No. 4,628,673.

The present invention relates to haying machines comprising at least two drums equipped at their lower part with a flexible skirt and with collectors distributed along their periphery in order to displace fodder plants lying on the ground.

Known machines of this type are perfectly suitable for operations such as wind-rowing, displacement or turning over of cut hay or for picking up fodder. In particular, they have the advantage of being able to contact the fodder plants softly and of not having metallic teeth in contact with the soil during operation.

These machines, however, are not yet able to ensure a hay tedding of good quality. For this operation it is necessary to turn over and spread well the fodder in order to suitably expose it to the sun.

The present invention has for its purpose to obviate this drawback.

To this effect, an important characteristic of the invention consists in providing on each machine means which raise said fodder plants into a zone situated between the drums in such a way as to bring them in contact with the collectors which ensure the hay tedding.

This raising brings the plants into the trajectory of the collectors which are fixed on the drums. These then have a sure hold on these cut plants which enables them to suitably spread them behind the machine.

Moreover, by virtue of this elevation whose height relative to the soil is equal to or greater than eight centimeters, the fodder plants are really turned over before falling back on the soil.

The means causing the lifting of the fodder plants advantageously are adjustable to different positions and/or detachable. They can thus be adapted to different working conditions. In addition, the machine can be used for other operations such as windrowing, moving or turning over of cut hay or for picking up.

According to another characteristic of the invention guiding elements preferably are also adjustable and/or detachable and are associated to these means. These elements direct the fodder plants to the sides in order to obtain a more uniform spreading. Moreover, they prevent the immediate falling back of the fodder on the ground as soon as they leave the skirts. This improves their contact with the collectors.

According to another characteristic of the invention, the collectors are pivoted in housings provided on the drums by means of shafts located in their extension or which are parallel thereto. These housings are directed toward a direction opposite the rotational direction of the corresponding drum and downwardly. This assembly makes it possible to adjust these collectors between at least two positions. In one of these positions the ends of the collectors which are directed towards the drums are practically tangential to the walls of these drums and their other extremities are practically radial. This position is selected for tedding. In the other position which is obtained by simply rotating around the pivoting shaft, they are entirely directed downwardly toward the direction opposed to the rotational direction. This position is suitable for wind rowing since it is less prone to damage the fodder plants.

Other characteristics and advantages of the invention will become apparent from the following description, reference being had to the accompanying drawings which represent by way of non-limiting examples various embodiments of the invention.

IN THE DRAWINGS

FIG. 10 is a cross section taken along line X—X of FIG. 9;

FIG. 11 is a detailed view of a guide of the example according to FIGS. 9 and 10;

FIG. 12 is a cross section similar to that of FIG. 8 for another embodiment;

FIG. 13 is a rear view in partial cross section of another embodiment;

FIG. 14 shows on a larger scale a detailed view of a collector according to the invention;

FIG. 15 is a detailed view of another form of collector;

FIG. 16 is a cross section of another embodiment;

FIG. 17 is a cross section view of another embodiment;

FIG. 18 is a top plan view of another embodiment of the invention and;

FIG. 19 is a rear view in partial cross section of the embodiment of FIG. 18.

Figure 1:
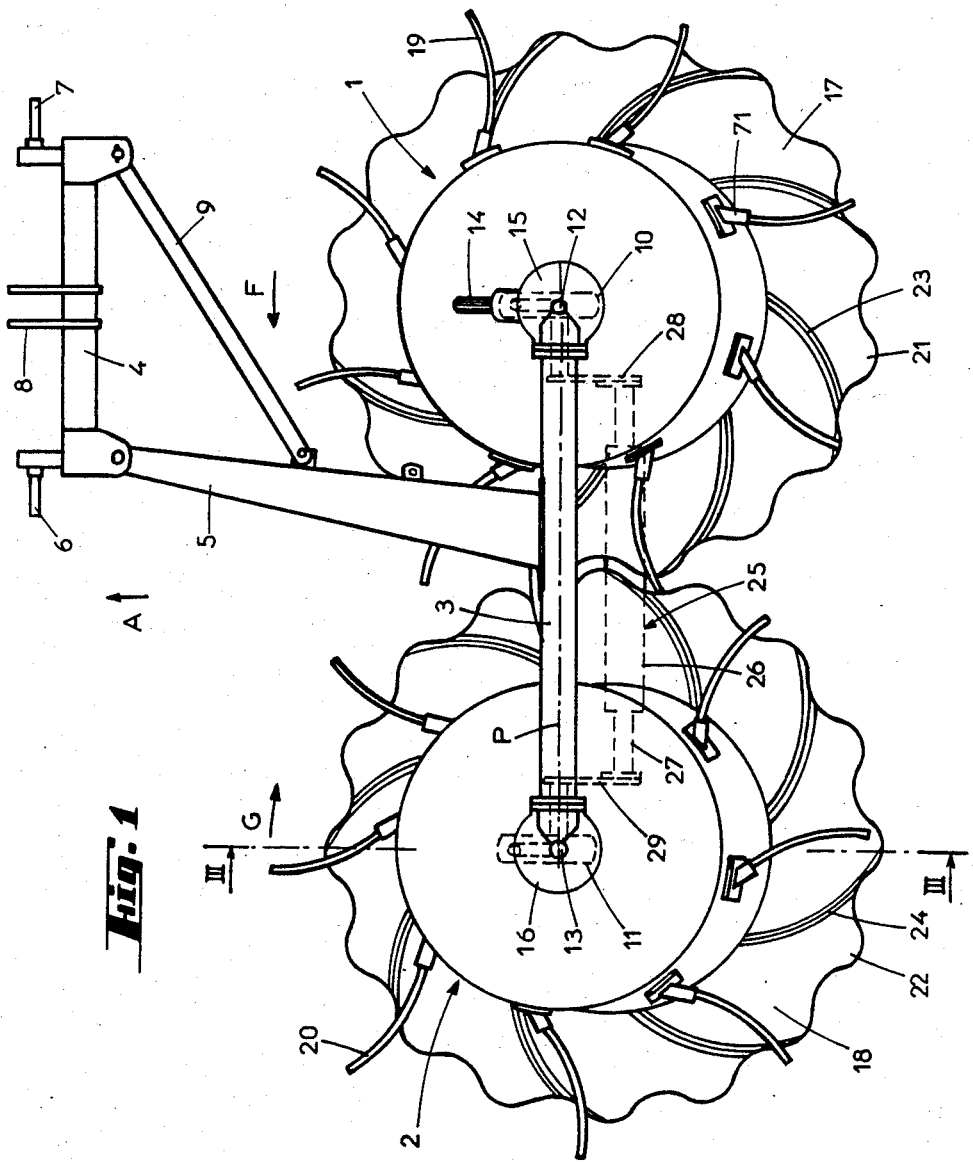
FIG. 1 is a top plan view of a first embodiment.

As shown in the accompanying drawings, the machine of the invention comprises two drums 1 and 2, connected by means of a chassis 3. This chassis is itself connected to a trestle 4 by means of a linking beam 5. The said trestle comprises two lower connecting points 6 and 7 and an upper connecting point 8 for coupling to the coupling device of a tractor which is not shown. The position of trestle 4 relative to the linking beam 5 can be defined by means of a cross piece 9. On each drum 1 and 2 is provided a roller 10 and 11 for allowing the machine to move on the ground in direction A.

During operation, the two drums 1 and 2 are rotated according to arrows F and G around shafts 12 and 13 which are slightly forwardly inclined relative to the direction of movement A. This driving effect is effected in manner known per se from the power shaft of a tractor. The said shaft is connected by means of a shaft with universal connection (not shown) to the end of a grooved shaft 14 which engages in the gear case 15 of chassis 3. This shaft drives drum 1 by means of a conical pinion and of a toothed wheel housed in said housing. The driving of drum 2 is effected by means of a transmission shaft housed in chassis 3. This shaft has at its extremity located in the gear case 15 a conical pinion which meshes with the previously mentioned toothed wheel, and at its other extremity which extends in the gear case 16 over drum 2, a second conical pinion meshing with a toothed wheel integral with said drum 2.

Each of these drums 1 and 2 carries at its lower part a flexible skirt 17 and 18 and on its periphery collectors 19 and 20 in order to pick up and move fodder plants lying on the ground. During operation these skirts 17 and 18 plunge under said cut plants and espouse perfectly irregularities on the ground and transport the fodder plants on their upper surfaces.

The said skirts 17 and 18 comprise on their outer edges protuberances 21 and 22, and on their upper surface, ribs 23 and 24 which facilitate the movement of the fodder plants.

In conformity with the present invention, the machine has means 25 which raise said fodder plants into a zone located between drums 1 and 2 in such a way as to bring them into contact with collectors 19 and 20 which ensure their tedding. Owing to this lifting the said collectors 19 and 20 exert a strong grip on the mass of the vegetable plants which are displaced. This allows said collectors to treat the fodder plants very vigorously and to spread them along a considerable width in order to accelerate the drying cycle. The height (H) of elevation relative to the soil is at least equal to eight centimeters. Good results have been obtained with heights (H) comprised between eight and thirty centimeters. This elevation makes it possible also to obtain a better turning over effect than that which is obtained with a simple projection at ground level.

Said means 25 advantageously are located under skirts 17 and 18 of drums 1 and 2. Thus they are practically not in contact with the fodder plants and do not in any way interfere with their displacement.

According to a characteristic of the invention, these means 25 are constituted by a device which lifts the skirts 17 and 18 of drums 1 and 2 into a zone located behind a plane (P) passing through shafts 12 and 13 of these drums. The fodder plants transported on the upper surface of the skirts 17 and 18 are then lifted in the same way.

Figure 2:
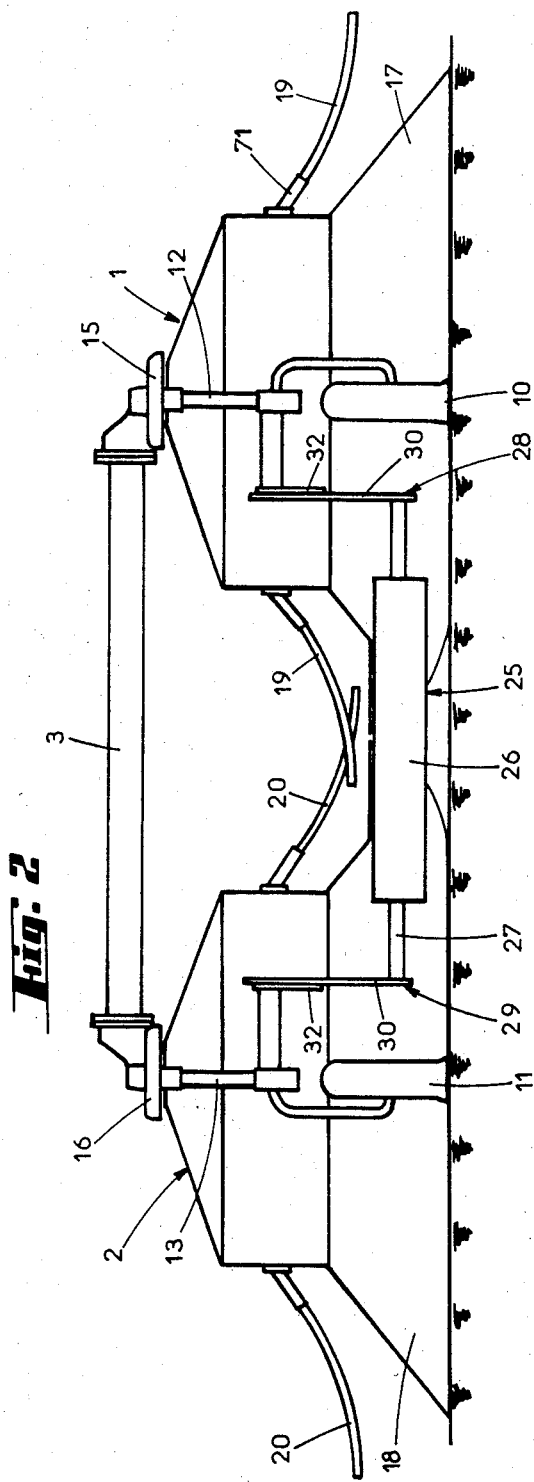
FIG. 2 is a rear view, in partial cross section of this embodiment.
Figure 3:
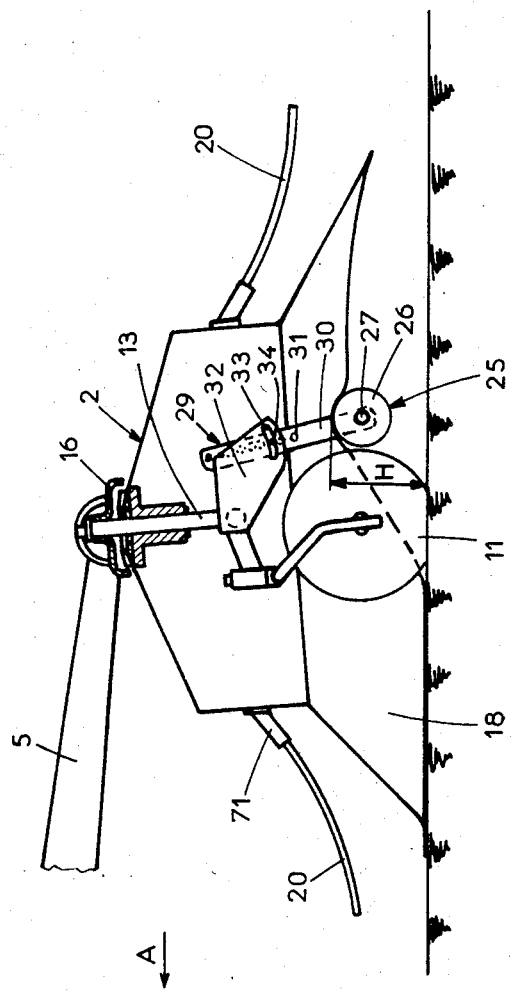
FIG. 3 is a cross section along III—III of FIG. 1.

In the embodiment of FIGS. 1 to 3, these means 25 consist of at least one roller 26. It is possible to employ two or more rollers in order to extend the zone of elevation. This roller 26 is freely rotatably mounted on a shaft 27. The extremities of this shaft 27 are guided in side supports 28 and 29 connected with shafts 12 and 13 of drums 1 and 2. During operation, roller 26 is rotated by skirts 17 and 18. This rotation avoids a considerable rubbing of skirts 17 and 18 on roller 26 and thereby their wear.

As it appears in particular from FIG. 3, the position of roller 26 is adjustable. This adjustment makes it possible to select the height of lifting and/or to modify its position in accordance with the nature and the volume of the fodder plants moved. To this effect, lateral supports 28 and 29 comprise plates 30 having several out of phase holes 31 and plates 32 each having an oblong hole 33. The holes 31 make it possible to modify the height of roller 26 relative to the soil while the oblong hole 33 makes it possible to modify its position toward the front or the back relative to the direction of movement A.

Roller 26 advantageously is removable. For this it suffices to separate plates 30 from plates 32 by unscrewing bolts 34. The machine can then be used for operations such as wind rowing, moving or turning over of hay or for picking up fodder plants.

Figure 4:
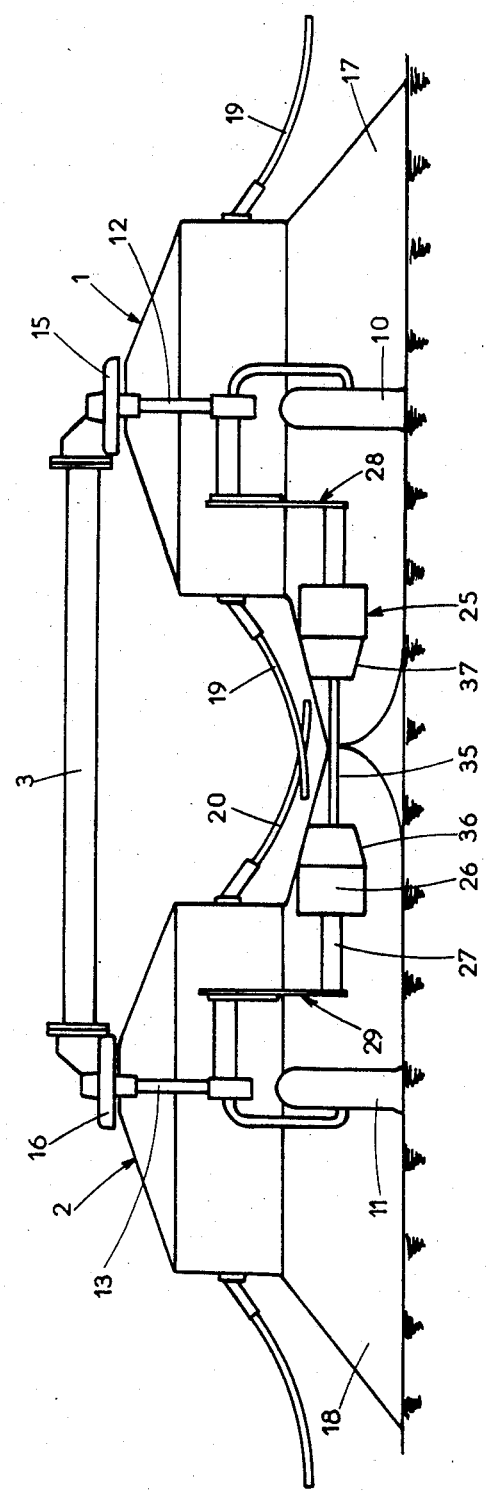
FIG. 4 is a rear view in partial cross section of a modification.

In the modification according to FIG. 4, roller 26 comprises a large central groove 35. In addition, each remaining lateral part comprises an inclined surface 36 and 37. These surfaces are in contact with skirts 17 and 18 and lift them.

This embodiment ensures a better distribution of friction along the entire width of skirts 17 and 18. In effect, the outside edges of skirts 17 and 18 which are in contact with the soil in the front part of the trajectory do not undergo any rubbing while passing on roller 26. This distribution makes it possible to increase the life span of skirts 17 and 18.

Figure 5:
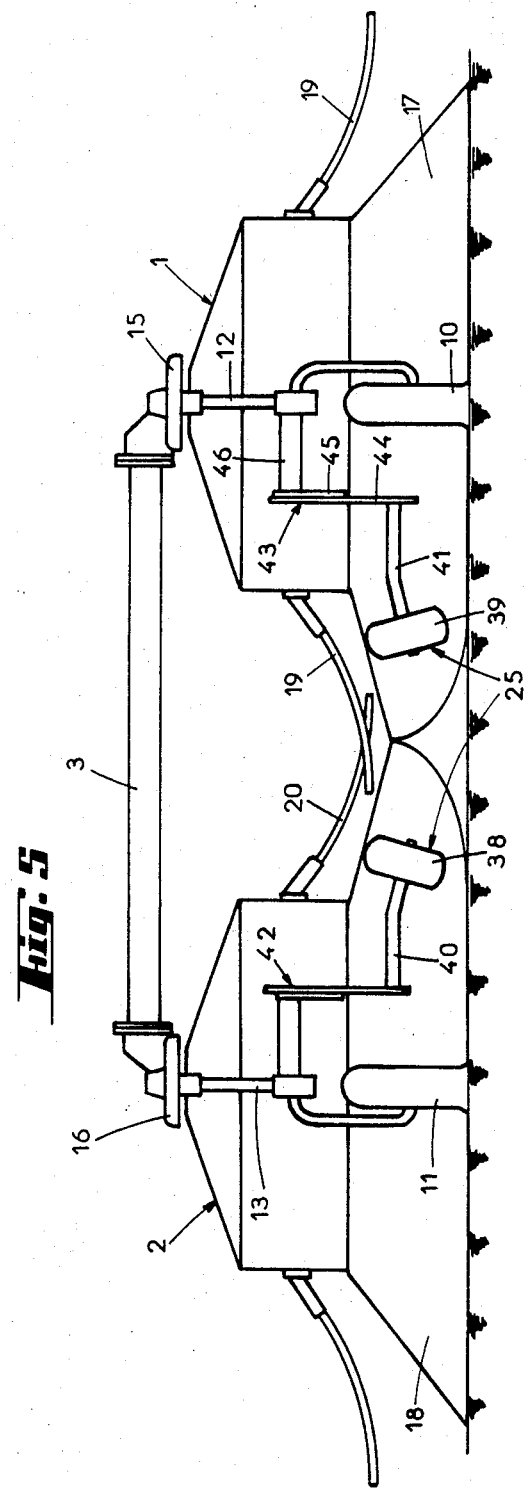
FIG. 5 is a view similar to FIG. 4 for another embodiment.

In the embodiment according to FIG. 5, the means 25 which lift skirts 17 and 18 are constituted by wheels or rollers 38 and 39. These rollers 38 and 39 are freely rotatably mounted on shafts 40 and 41 connected to shafts 12 and 13 of drums 1 and 2. This connection is ensured by means of supports 42 and 43 consisting each of a strut 44 of a plaque 45 and a brace 46. The position of these rollers 38 and 39 are adjustable by moving struts 44. They can also be detached in order to eliminate the lifting of skirts 17 and 18 if the operator desires to use the machine for another operation than tedding. These rollers 38 and 39 also make possible a distribution of the friction on practically the entire width of skirts 17 and 18.

Figure 6:
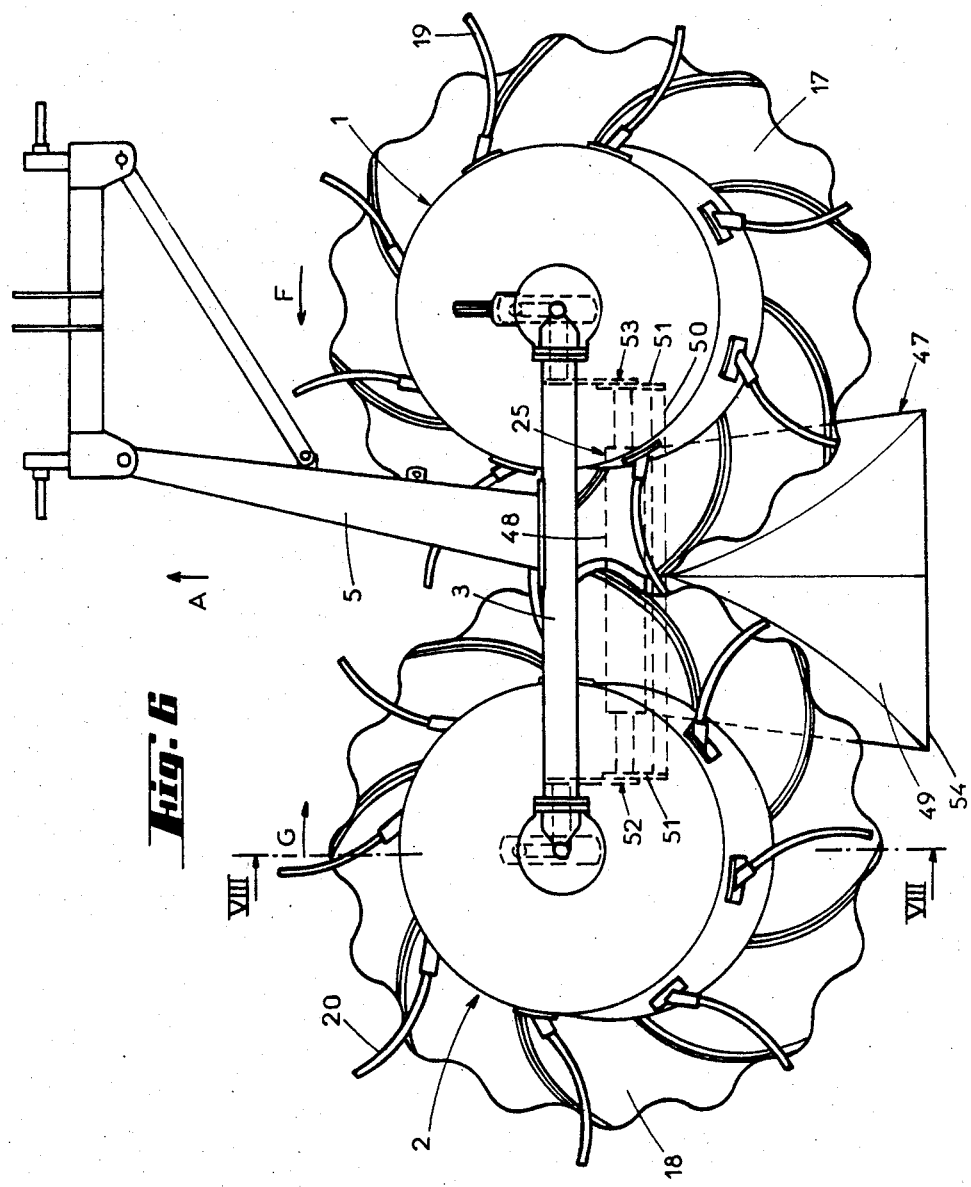
FIG. 6 is a top plan view of a further embodiment.
Figure 7:
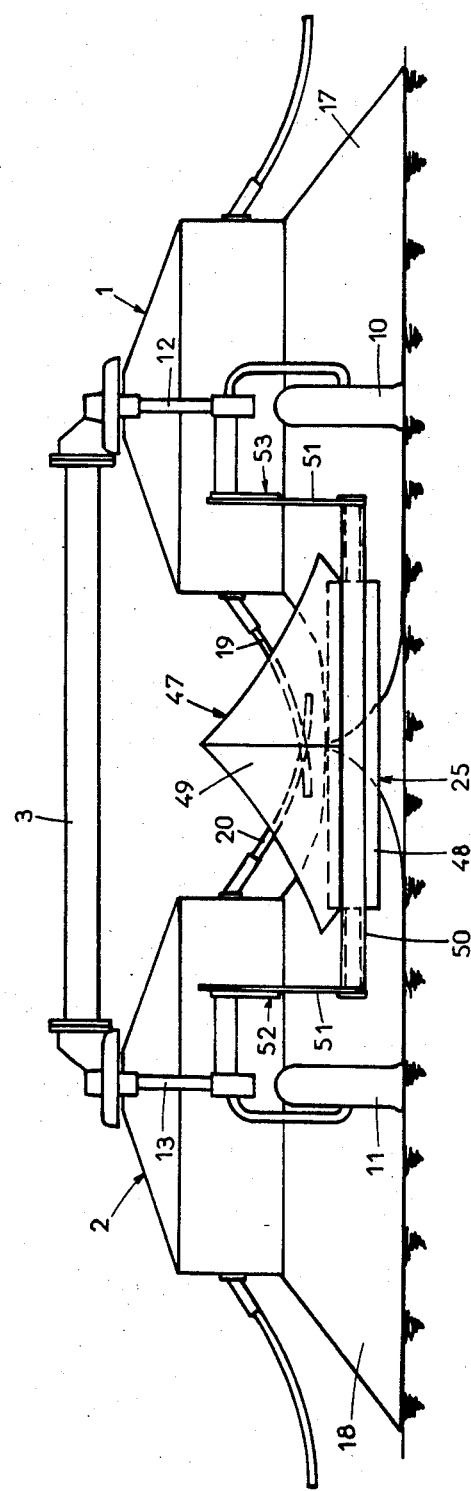
FIG. 7 is a rear view in partial cross section of the embodiment of FIG. 6.
Figure 8:
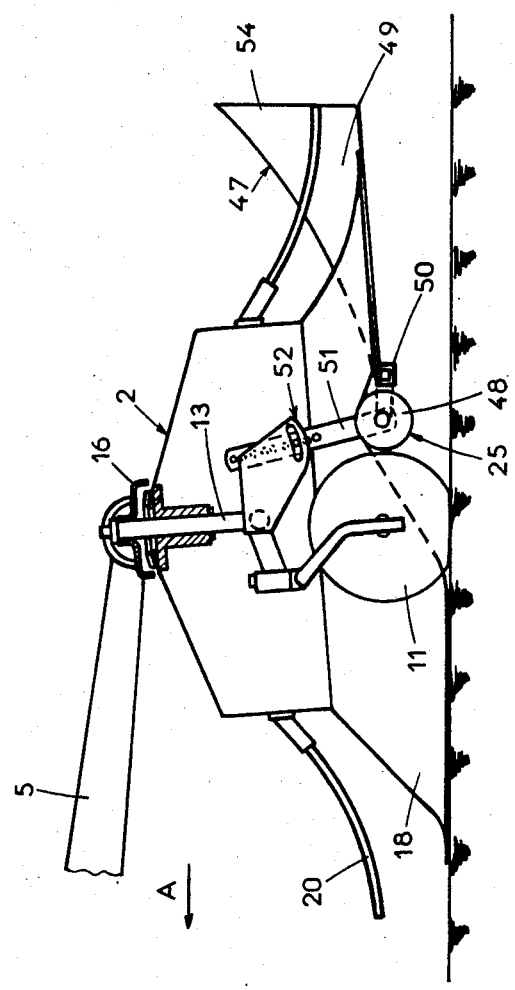
FIG. 8 is a cross section taken along line VIII—VIII of FIG. 6.

The embodiment according to FIGS. 6 to 8 differs from the preceding examples by the presence of a guiding element 47. This element is associated to means 25 which are constituted in this example by a roller 48 in order to improve the spreading of fodder plants behind the machine.

Guiding element 47 is constituted by a plate or deflecting sheet 49 placed behind roller 48. This sheet is fastened to a cross piece 50 connected to struts 51 of lateral supports 52 and 53 of roller 48. The deflecting sheet 49 and roller 48 form an assembly. The said sheet 49 extends rearwardly preferably beyond skirts 17 and 18 and passes partially thereunder. Its rear part is larger and higher than its front part which is directed toward roller 48. As this is clearly indicated on FIG. 7, this sheet 49 has a V-shaped cross section whose apex is upwardly directed.

Said sheet 49 thus prevents the fodder plants from falling back on the ground immediately after leaving skirts 17 and 18. Owing to its shape it guides these plants towards the sides in order to obtain a more uniform layer on the entire width of the strip being worked.

This guiding element 47 can also consist of rods placed side by side or even by driven means.

Roller 48 and guiding element 47 are adjustable and/or detachable in the same way as roller 26 of the example shown in FIGS. 1 to 3.

Figure 9:
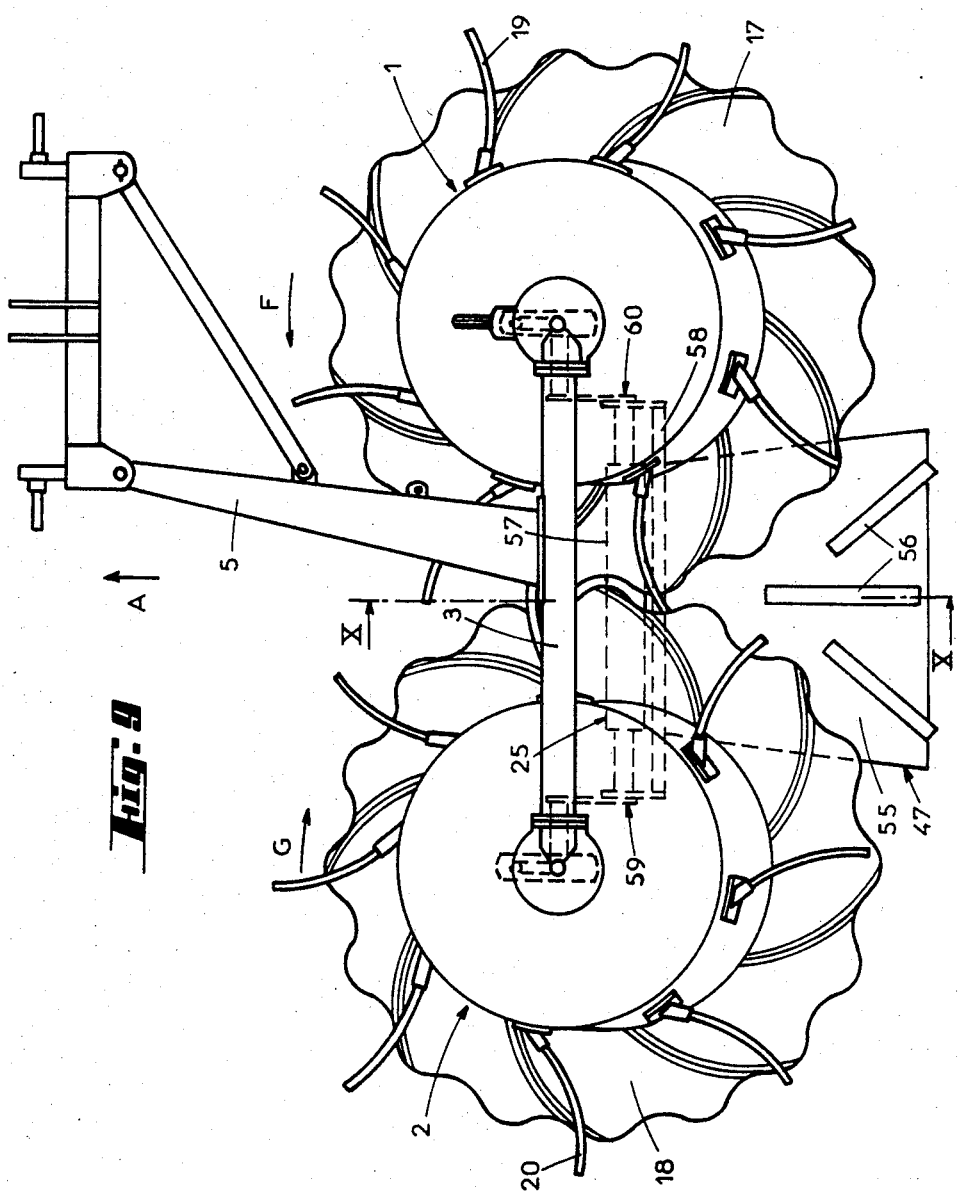
FIG. 9 is a top plan view of another embodiment.

In the embodiment shown in FIGS. 9 to 11, guiding element 47 consists of a substantially flat plate or sheet 55 equipped with deflectors 56. This sheet 55 is positioned behind a roller 57 which lifts skirts 17 and 18. It is fixed to a cross piece 58 connected to lateral supports 59 and 60 of the said roller 57. Sheet 55 and roller 57 thus form an assembly whose position is adjustable by means of lateral supports 59 and 60. This assembly is also detachable. Deflectors 56 are directed in such a way that they distribute the fodder plants on the rear side of the machine. Their position relative to sheet 55 advantageously is adjustable. To this effect, each deflector 56 is pivoted to sheet 55 by means of its front end and has a sector 61 which engages into a slot 62 provided in said sheet (see FIG. 11). This sector 61 has an oblong hole 63 through which passes a tightening bolt 64 which also passes through a stud 65 fixed against the lower surface of sheet 55. Owing to this oblong hole 63 and to bolt 64, each deflector 56 can be immobilized in different positions relative to sheet 55. These deflectors 56 can for example be raised as shown in FIG. 11 or lowered so as to be practically parallel to sheet 55. Intermediate positions can also be selected. In upright position, they retain more of displaced fodder plants. This position will be preferably selected in the case where the volume of fodder plants to move is small in order to improve the grip of collectors 19 and 20 on these plants. However, when the volume of fodder plants is considerable it is preferred to lower deflectors 56 to facilitate their movement.

It is evident that guiding means 47 can also be associated to roller 26 in FIG. 4 or to runners 38 and 39 of FIG. 5.

In the modification of FIG. 12, means 25 which lifts skirts 17 and 18 and guiding element 47 consists of the same member 66. The latter has the shape of a sheet whose front end is downwardly bent. This bent end lifts skirts 17 and 18. The part located behind this bent end has an inverted "V" cross section in order to better disperse the fodder plants. It can also be almost flat and comprise deflectors identical to those of the example shown in FIGS. 9 to 11.

Member 66 is fixed to lateral supports 67. Each of these comprises a strut 68 and an adjusting plate 69 which is connected to shaft 12 or 13 of the corresponding drum 1 or 2. The position of this piece can be adjusted by means of strut 68. It is also detachable in order to allow other operations than tedding.

In the modification according to FIG. 13, member 66 comprises a large central groove 70. This groove makes it possible to avoid rubbing on member 66 by the outside of skirts 17 and 18 which are in contact with the soil during operation. There is thus no additional wear of these outer parts which increases the useful life of skirts 17 and 18.

Collectors 19 and 20 which are provided on the walls of drums 1 and 2 are bent and are pivoted in supports 71 fixed on said drums by means of bolts 72 (FIG. 14). Each collector 19 and 20 has a pivoting shaft 73 engaged in a housing 74 provided in said support 71. This pivoting shaft 73 is located in the extension of collector 19 and 20 which corresponds thereto or is practically parallel thereto. Said housings 74 are directed in the direction opposite to the direction of rotation (F) or (G) of the corresponding drum 1 or 2 and downwardly (see also the preceding figures.).

These collectors 19 and 20 can be stopped in at least two different positions relative to drums 1 and 2. Their locking in each position is effected by means of a bolt 75. In one of these positions which is shown in continuous lines in FIG. 14, the ends of collectors 19 and 20 which are directed toward drums 1 and 2 are practically tangential to the walls thereof, while their other ends are practically radial. Moreover, the trajectories of the collectors 19 and 20 of two neighboring drums overlap partially. This position is suitable for tedding since it gives a good grip on the cut plants.

In the other of these positions which is shown in dots and dashes in FIG. 14, collectors 19 or 20 are completely downwardly directed and toward the direction opposite to the rotational direction of the corresponding drum 1 or 2. This position is reached by making them pivot by about 180° in the housings 74 of supports 71. In this position the collectors 19, 20 do not grab the plants as in the preceding position. Moreover, the diameter of their trajectory is reduced in such a way that there is no longer any partial overlap between the drums 1 and 2. This position is selected for wind-rowing or for moving or turning over hay.

According to FIG. 15, each collector (19, 20 comprises two substantially parallel branches 76 and 77. This arrangement increases the efficiency of these collectors.

In the example shown in FIG. 16, means (25) which lift the fodder plants are constituted by nozzles 78 connected to blowers 79 by conduits 80. The said nozzles 78 send jets of air through orifices 81 provided in skirts 17 and 18. This air blows the fodder plants from the upper surface of skirt 17 and 18 and brings them into contact with collectors 19 and 20 so as to ted them. For wind-rowing these fodder plants, the blowing of air is stopped and the position of collectors 19 and 20 is modified as previously described.

Adjustable and/or detachable guiding elements 47 similar to those described in connection with the examples of FIGS. 6 to 13 can also be provided on the machine according to FIG. 16.

As shown in FIG. 16, there is provided a blower 79 for each drum 1 or 2. Each blower is located inside drum 1, 2 corresponding thereto and is connected to the support shaft 12, 13 of this drum. The driving of blower 79 is effected by means of a belt 82 passing on two pulleys 83 and 84. Pulley 84 is rotationally connected to the corresponding drum 1 or 2. The upper part of each drum 1 or 2 has openings 85 to allow inlet of air to blower 79.

In the machine according to the example of FIG. 17, the means (25) for lifting the fodder plants consist of levers 86 connected to skirts 17, 18 and cooperating with guiding cams 87 which are stationary during operation. Skirts 17 and 18 are pivoted to drums 1, 2 by means of pivots 88. The cams 87 are fixed on supporting shafts 12, 13 of drums 1, 2 and have a different level toward the bottom. Each level 86 has at its end which is directed towards cam 87 of the corresponding drum 1 or 2 a roller 89 which moves in said cam during the rotation of drums 1 and 2.

Thus, when during operation rollers 89 pass in the different level, they displace levers 86 downwardly. These then make skirts 17, 18 pivot upwardly around pivots 88. This pivoting raises the fodder plants on skirts 17 and 18 in such a way that they can be contacted by collectors 19, 20. As in the previous examples, an adjustable and detachable guiding element 47 can be associated with drums 1 and 2 in order to improve the spreading of the fodder plants.

The cam 87 of each drum 1 and 2 can be angularly displaced around support shaft 12, 13 corresponding thereto. Thus by rotating of cams 87 it is possible to bring the pivoting zone of skirts 17 and 18 in the rear parts of drums 1 and 2. That is to say, the part where the fodder plants have already left skirts 17 and 18. Thanks to this adjustment, it is possible to eliminate the lifting of fodder in the zone located between drums 1 and 2. This position is suitable for depositing the fodder plants in the form of rows or for moving or turning over rows already formed. In this case collectors 19, 20 can also be brought into a position where they will deal less harshly with the fodder.

In a modification of FIGS. 18 and 19, lifting means 25 which raise skirts 17 and 18 consist of disks or plates 90 and 91. These disks are freely rotatable on shafts 92 and 93 which are slightly inclined. Said shafts are integral with arms 94, 95 which are pivoted on bent supports 96 and 97. The latter are connected to shafts 12 and 13 of drums 1 and 2. These supports 96 and 97 can be adjusted to different positions around shafts 12 and 13 in order to vary the position of gears or disks 90 and 91 in a substantially horizontal plane. They can also be moved along shafts 12 and 13 in order to vary the position of disks 90 and 91 with respect to height. Stopping of these supports 96 and 97 in the selected position can be accomplished by means of screws which are not shown.

The arms 94 and 95 can also be moved around their pivots 98 and 99 with bent supports 96 and 97 for an additional adjustment of the position of disks 90 and 91. Stopping of these arms 94 and 95 also can be achieved by means of screws.

Arms 94 and 95 and bent supports 96 and 97 advantageously have a shape of a V (see FIG. 18). This arrangement makes possible a large selection of positions into which disks 90 and 91 can be placed.

Said disks 90 and 91 can also be moved towards the middle of each drum (1 and 2) and/or downwardly so that they no longer lift or practically not lift skirts 17 and 18 during operation. In this position the machine can be used for other operations such as haying or turning over of hay. It is evident that it is also possible to detach disks 90 and 91 if it is desired to eliminate their cooperation with skirts 17 and 18.

These disks 90 and 91 advantageously are very low. Owing to this fact, they are relatively far from the ground and thus less exposed to shocks against obstacles on the ground. Moreover, in this embodiment, there is no member traversing the interval between the two skirts 17 and 18. There is accordingly no risk of accumulating fodder at this point.

As in the previously described examples, it is possible to associate an adjustable and detachable guiding element 47 to drums 1 and 2 in order to improve spreading of the cut hay.

It is evident that it is possible to vary the number of drums per machine. It is also possible to modify the above examples which were described in non-limiting fashion and to bring thereto various improvements, modifications or additions, or to replace certain elements by equivalent elements without thereby departing from the scope of the present invention.

I claim:

1. A haymaking machine comprising at least two drums; a flexible skirt on the lower part of each drum; spaced collectors on the periphery of said drums; means located at least partially under the skirts of said drums for raising cut fodder plants into a zone located between the drums, and wherein each collector is curved and articulated on the periphery of its respective drum by means of a shaft so that each collector can be pivoted and stopped in two different positions, one for tedding in which its outer end is practically radial and the other for windrowing in which said collector is directed toward the direction opposite to the rotational direction of its respective drum and the diameter of its trajectory is reduced.

2. Machine according to claim 1, wherein the shaft of each collector is located in extension of the said collector and is engaged in a housing fastened onto one of said drums, said housing extending downwardly and in the opposite direction from the rotation of the drum on which said housing is fastened.

3. Machine according to claim 1 wherein each collector has two ends, when in a tedding position, the end of each collector directed toward the drum is practically tangent to the drum surface while its outer end is practically radial.

4. Machine according to claim 1 wherein each collector comprises several substantially parallel branches.

5. Machine according to claim 1, wherein the shaft of each collector is practically parallel to said collector and is engaged in a housing fastened onto one of said drums, said housing extending downwardly and in the opposite direction from the direction of rotation of the drum on which said housing is fastened.

6. A haymaking machine according to claim 1 wherein the shaft is engaged in a housing forming an angle with the periphery of the drum.

* * * * *